United States Patent [19]

Simon et al.

[11] Patent Number: 5,102,107
[45] Date of Patent: Apr. 7, 1992

[54] RESILIENT SUPPORTS FOR SHOCK ABSORBING SYSTEMS

[75] Inventors: Jean-Michel Simon, Clamart; Jean-Pierre Ciolczyk, Montargis, both of France

[73] Assignee: Hutchinson, Paris, France

[21] Appl. No.: 527,655

[22] Filed: May 23, 1990

Related U.S. Application Data

[63] Continuation of Ser. No. 297,621, Jan. 17, 1989, abandoned.

[30] Foreign Application Priority Data

Jan. 15, 1988 [FR] France .............................. 88 00435
May 17, 1988 [FR] France .............................. 88 06584

[51] Int. Cl.$^5$ ............................................. F16F 3/10
[52] U.S. Cl. .................................... 267/152; 248/621; 248/634; 267/30; 267/140.3; 267/140.5; 267/149; 267/164; 267/165; 280/715
[58] Field of Search .................. 267/30, 141.1, 148, 267/149, 152, 164, 165, 257, 258; 248/619, 621, 634; 280/715; 180/300, 312, 902

[56] References Cited

U.S. PATENT DOCUMENTS

| | | | |
|---|---|---|---|
| 1,497,152 | 6/1924 | Masury et al. | 267/30 |
| 1,683,332 | 9/1928 | Chilton | 267/30 |
| 1,708,219 | 4/1929 | Geyer | 267/30 |
| 1,735,899 | 11/1929 | Henry | 267/30 |
| 2,154,586 | 4/1939 | Stern | 267/141.1 X |
| 2,612,370 | 9/1952 | Eger . | |
| 2,913,240 | 11/1959 | Mohr . | |
| 2,965,349 | 12/1960 | Hutton . | |
| 4,854,556 | 8/1989 | Pietrzak | 267/152 X |

FOREIGN PATENT DOCUMENTS

| | | |
|---|---|---|
| 0042068 | 5/1981 | European Pat. Off. . |
| 0054493 | 6/1982 | European Pat. Off. . |
| 0055824 | 7/1982 | European Pat. Off. . |
| 0132048 | 1/1985 | European Pat. Off. . |
| 0192936 | 9/1986 | European Pat. Off. . |
| 0223617 | 5/1987 | European Pat. Off. . |
| 814362 | 9/1951 | Fed. Rep. of Germany ........ 267/30 |
| 1228863 | 11/1966 | Fed. Rep. of Germany . |
| 2944439 | 5/1981 | Fed. Rep. of Germany . |
| 2138543 | 1/1973 | France . |
| 2362308 | 3/1978 | France . |
| 2418389 | 9/1979 | France . |
| 2451511 | 10/1980 | France . |
| 213983 | 6/1941 | Switzerland . |
| 1024554 | 3/1966 | United Kingdom . |
| 1098424 | 1/1968 | United Kingdom . |
| 1511692 | 5/1978 | United Kingdom . |
| 1539018 | 1/1979 | United Kingdom . |

Primary Examiner—George A. Halvosa
Attorney, Agent, or Firm—Larson and Taylor

[57] ABSTRACT

A resilient support for a suspension system of the type comprising two frameworks (1) capable of being fastened to two assemblies between which the support is intended to be interposed. The support includes, as the main resilient element intended for supporting a load, at least one resilient tubular member (3), the axis (y) of which extends perpendicularly to the main direction (z) in which the load is exerted. An elastic material (2) is bonded or fixed on either side of the tubular member (3) for fastening the tubular member to a respective framework.

25 Claims, 4 Drawing Sheets

RESILIENT SUPPORTS FOR SHOCK ABSORBING SYSTEMS

This application is a continuation of application Ser. No. 07/297,621 filed Jan. 17, 1989.

The present invention relates to resilient supports for shock absorbing systems of the type comprising two frameworks provided with means for respectively fastening them onto two assemblies between which the support is to be interposed.

In particular, it may concern, although not exclusively, supports intended for the suspension of the body of a vehicle, particularly in the area of the rear undercarriage crossbeam. It may also relate to supports intended for the suspension of an engine, whereby these supports may have characteristics which are different from the ones of the vehicle body supports.

The object of the present invention is, generally speaking, to obtain relatively simple and inexpensive, highly reliable supports and which in particular are free from the drawbacks encountered with rubber or elastomers whenever a very low stiffness or resistance to elastic deformations is required. In this case, we are actually compelled to reduce the working thickness of the elastomer, and this material hence becomes very sensitive to the risk of plastic flow or creep and buckling, which should be avoided.

To this end, a support for a shock absorbing system according to the invention will essentially be characterized in that it includes as main resilient element, intended for supporting the load, at least a resilient tubular member, the axis of which extends perpendicularly to the main direction in which said load is exerted, whereby suitable connecting means are provided on either side of said tubular member for its fastening between said frameworks, these means comprising an elastic material bonded or fixed by other means between each tubular member and the corresponding framework.

By a proper selection of the shape (slenderness) of this tubular member, of the material it is made of and of its thickness, it can be conceived that a low stiffness can be obtained if necessary, at least in the direction in which the main load is exerted, and without the risk of plastic flow or creep or buckling which would result from the only use of an elastomer or rubber.

As to the connecting means to be provided on either side of the tubular member(s) for its fastening between the support frameworks, it will advantageously include an elastomer bonded or fixed by other means such as mechanical means, between each tubular member and the corresponding framework.

In this area, an elastomer proves to be an excellent means of connection since it makes it possible to properly distribute the stresses between the frameworks (which, as a rule, are flat) and the resilient tubular members ; besides, such elastomer may be used for vibration damping purposes. Its thickness will be selected based upon the specific requirements, and especially depending upon the stiffness or resistance to elastic deformations which should desirably be bestowed upon the support in the direction of the axis of the tubular member (s). This concept will be further discussed below.

Now, as to the material constituting said tubular member, there may advantageously be used any suitable composite material arranged for example under the form of a resin-embedded filament winding.

There may be used for example fibers from any material featuring the appropriate tensile strength, for example glass, carbon, Kevlar, etc immersed or embedded in epoxy resin or similar, whereby the winding is performed preferably around the periphery of the tubular member in one or several helical layers.

Owing to the relatively high stretch ratio of such fibers (approximately 10 times higher than steel) the support thus obtained meets the aforesaid specifications, which makes it possible to attain a greater flexibility in the required direction, especially in the direction of the main load.

These fibers also feature, alike steel (which, if need be, could be used in some cases), a very low plastic flow or creep and a small increase in stiffness under higher frequencies, which as will be seen below, results in a major advantage in certain applications. In addition, any risk of buckling is practically excluded.

As to the cross section of the tubular members, it may constitute an additional adjusting parameter and may be, for example, at least approximately circular, elliptic or oval.

In the case of an elliptic or similar cross section, namely having a dimension superior, in a direction, to the dimension it has in the direction perpendicular to the previous one, it may besides advantageously be provided for the arrangement of the tubular member with its major axis directed in the main direction in which the load is exerted, i.e. perpendicularly to the plane of frameworks, whereas its smaller axis is obviously perpendicular to this direction as well as to the axis of the tubular member.

This arrangement of elliptic cross sections or alike is advantageous in that one can thus increase the effect of a slight vertical shifting or displacement of the frameworks with respect to one another by converting it into a greater shifting or displacement on the side parts which are not directly subjected to stresses from the tubular member, which thus results in having a greater range of adjustment over the displacement in the direction (hereunder called "lengthwise direction") which is thus perpendicular to the main direction in which a load is exerted and perpendicular to the axis of this tubular member.

According to another arrangement of the invention, there can be provided for arranging between the frameworks at least two resilient tubular members disposed with a spacing parallel to one another.

In its principle, the operation of the support will be essentially the same as in the case of a single tubular member.

Beside the fact of solving in a very simple way the problem mentioned at the beginning of the description, as well as other more specific problems which will be discussed further below, the present invention makes it possible to easily obtain damped supports, and this without any increase in room requirements.

To achieve this, an appropriate damping material can in fact be incorporated into the support, especially an elastomer featuring a high damping coefficient, for example Butyl, in order to connect two opposite walls of the tubular members (the ones which are likely to draw most aside from each other) or still a filling material for example a silicon gel or a closed cell foam can be disposed in these tubular members or into other cavities of this support.

It can also be interesting to obtain a prestressed resilient support. To achieve this, it suffices to mold the elastomer material on either side of the tubular member (s), whereby the latter are prestressed under a pressure exerted in the direction of the main load. A much less bulky support and easier to adjust than is the case with a non-prestressed support can thus be obtained.

Among more specific problems that the supports according to the invention make it possible to solve, there can be cited in particular the one involving the production of supports featuring very anisotropic stiffness in three orthogonal directions, and the one involving the production of supports with a stiffness gradient in the main direction of the load or "vertical direction.

The first type of supports may include in particular the ones intended for the suspension automotive vehicle bodies, in particular in the area of the rear undercarriage crossbeam.

In this type of application, it is endeavored to obtain a support featuring a very high anisotropy in the directions of its three orthogonal axes x, y and z. In particular, one aims at obtaining:

a very high stiffness Ky in the crosswise direction of the vehicle, or axis of the y's, viz. a stiffness in the order of 10,000 N/mm, this in order to avoid a side displacement of the body with respect to the wheels when negotiating a turn;

a very low stiffness Kx in the lengthwise direction of the vehicle, or axis of the x's, viz. a stiffness in the order of 50 N/mm, this in order to decrease to a maximum the running noises of the vehicle (Ky/Kx in the order of 200);

a mean stiffness Kz in the vertical direction (hereabove referred to as "main direction of the load") 750 N/mm.

All of these values are, of course, supplied merely for information purposes.

Up to now, many a difficulty has been encountered in obtaining the desired high anisotropy, and in particular the aforesaid ratio of 200 between the crosswise and lengthwise stiffness, even with the incorporation of rubber/metal laminated resilient pads.

It can now be appreciated that the support as described above, in either one of its embodiments, may easily solve this problem.

It suffices to arrange for the tubular members of the support to extend in the direction referred to above as the crosswise direction y of the vehicle, and for the thickness of the elastomer which connects said tubular members to the frameworks to be sufficiently small so as to maintain a great stiffness of the support in this direction.

In view of this, it can be appreciated that the very high anisotropy which is desired in certain cases between the crosswise (Ky) and lengthwise stiffness (Kx) can thus be obtained. As a matter of fact, in the lengthwise direction each tubular member can roll or tilt without any great resistance, which makes it possible to obtain a very low value for Kx (the rolling behavior takes place as the one of a cross-country tracklaying vehicle, although of course under a very small angle). In return, the deformation in the crosswise direction can be very limited and the stiffness very substantial since it is essentially determined by the shearing of the material in the area of said connecting means between said tubular member and the frameworks, this member featuring a very great stiffness in this direction y. This will be further discussed below when going through the description of examples hereunder with reference to the drawing.

As to the intermediate stiffness in direction z, the required value can easily be bestowed upon it, as indicated above, by properly selecting the material constituting the tubular members, its thickness and the shape of these members.

If need be, the stiffness of the support in the crosswise direction can furthermore be increased by providing said frameworks with catches projecting at least inwardly from the support and directed parallel to one another in the lengthwise direction.

It will be appreciated that by doing so the shearing stress of the elastomer between the tubular member and each framework in direction y is reduced to a very large amount.

A support according to the invention can still be arranged with a view to being used in further applications or in closely related applications, for example in the suspension of vehicle engines.

As will be ascertained hereunder, the same basic principle makes it possible to obtain further characteristics of the support or additional characteristics answering the problem raised.

With a view to supporting an engine, it is endeavored to obtain a resilient support in such a way that within a wide range of frequencies (from 0 to 300 Hz) and for low oscillations (having an amplitude in the order of ±0.1 mm) the dynamic stiffness Kd varies only in a slight way from the static stiffness Ks. In return, for substantially stronger amplitudes (in the order of ±1 mm of amplitude) the dynamic stiffness Kd must be much greater than the static stiffness Ks (from 3 to 4 times greater). The static stiffness Ks must be very low, in the order of from 50 to 80 N/mm, which proves difficult to obtain without any flow or creep. Up to now this problem could only be solved and some imperfect way, in this with two types of supports:

hydraulic supports which are rather complicated and therefore costly; they, moreover, find it difficult to exhibit the very low static stiffness required, without any risk of flow or creep as regards their elastomer components.

The elastomer supports with a stiffness gradient, the stiffness of which increases sharply from a certain extent of deformation, and consisting of the stacking of a "hard" spring out of rubber and of a "soft" spring, namely of a spring with low stiffness.

However, it is very difficult to produce such a spring with a low stiffness, in the order of from 50 to 80 N/mm which permanently supports a static load in the order of 1,000 N, without facing problems of flow or creep in the engine housing.

A further object of the invention is therefore to solve this more specific problem, i.e. to obtain a support with a stiffness gradient featuring the aforesaid characteristics, in particular the absence of stiffness under higher frequencies and the absence of flow or creep, and this with the support of the general type defined at the beginning of the description, merely supplemented with a few appropriate arrangements.

To this end, there will be used, according to a further arrangement of the invention, a support of the type defined at the beginning of the description, with a tubular member out of composite material consisting for example of a resin-immersed filament winding, and comprising besides a resilient element featuring a stiffness gradient in the vertical direction (axis of the z's), viz. the stiffness of which sharply increases when a determined crushing point of the support is reached.

In the case of an application to the supports for engines, this structure makes it possible to easily obtain a low vertical stiffness without any risk of flow or creep, since the composite material is, as already pointed out above, hardly susceptible to flow. Similarly, no stiffening under frequencies is encountered since the composite material virtually does not exhibit any.

Moreover, in order to provide such a support with the desired stiffness gradient, several means can be resorted to.

According to a first embodiment, there can be used a support of the type comprising between said frameworks at least two resilient tubular members arranged, with a spacing parallel to one another, whereby at least an elastomer void space is provided between said tubular members, characterized in that said void space contains several closed cells constituted and superimposed in the elastomer, the cross section of which essentially extends in the horizontal direction, these cells being intended for being totally flattened when said determined crushing point of the support is reached.

It can be appreciated in fact that the stiffness of the support in the vertical direction will sharply increase as soon as said cells are completely flattened out and therefore when the vertical stiffness is practically the one of the elastomer occupying the space comprised between the two tubular members.

According to a second embodiment, there can be used a support of the type comprising, between said frameworks, at least two resilient tubular members arranged, with a spacing, parallel to one another, at least an elastomer void space being provided between said tubular members, characterized in that the cross section of said elastomer void space essentially extends in the vertical direction, whereby this space is intended for being totally flattened out when a determined crushing point of this support is reached, this flattening out following upon a widening of the cross section of said tubular members.

According to an alternative arrangement of these embodiments, one can furthermore provide for the support to comprise an external tubular member, surrounding the two said tubular members arranged parallel one to the other, the latter ones being made up of a composite material with a relatively high stiffness, whereas said external tubular member is made up of a composite material with low stiffness.

Therefore, the stiffness of the support in the vertical direction (axis of the z's) can remain very low up to the time when the cells (or said void space) are completely flattened out, time from which, as desired, the stiffness of the support will sharply increase.

According to another alternative arrangement, closely related to the aforesaid alternative when applied to the second embodiment, one can still use a support characterized in that said tubular member is arranged in such a way that its cross section globally extends in said lengthwise direction and in that said resilient element consists of at least a pair of legs out of a composite material coated with elastomer, approximately extending in the vertical direction and connecting the opposite walls of said tubular member, being thus compressed at their ends under the action of vertical stresses exerted onto said frameworks, the legs belonging to the same pair being slightly curved one towards the other, in such a way that when a determined vertical stress is reached, they abut against one another, which sharply increases the stiffness of the support in the vertical direction.

As can be appreciated, this support with a stiffness gradient operates according to virtually the same principles as the one in which one resorts to the flattening out of the void space which extends between two neighboring tubular members. Actually, the legs behave alike the walls of the tubular members which come into abutment against one another during said flattening out of said void space, from which the stiffness of the support in the vertical direction sharply increases.

Another object still of the present invention is to enable, while maintaining the aforesaid advantages, the manufacture of the resilient tubular members to be facilitated and prove less costly, and also enable the process of manufacture to be implemented on a high productive capacity scale.

To achieve this, a resilient support of the type as generally defined at the beginning of the description, is still, according to an alternative construction of the present invention, essentially characterized in that said resilient tubular member consists of at least an open profile. The profiles may for example amount to a number of two and be identical, in which case there will advantageously be symmetrically arranged one to another in relation to a plane defined by said main direction (z) and by said axis (y). These profiles may be opened one towards the other or opposite to one another.

Irrespective of the embodiment selected, it can be appreciated in any case that since these profiles are opened, thus being in the shape of a trough, they can be manufactured by a pultruding process, viz. a continuous manufacturing process consisting in shaping a strip of fabric, a web of unidirectional fibers or alike running continuously, consisting of resistant fibers (glass, carbon, Kevlar, etc.) in order to shape it to the desired profile and impregnate it with an appropriate resin which is subsequently polymerized.

Any costly process for winding the tubular members is thus avoided, whilst maintaining the advantages offered by them as regards the resilient characteristics as well as the easy fastening thereof onto the frameworks of the support.

To this end, provision can be made for example so that said means of fastening of the tubular member (s) onto the frameworks incorporate anchoring means for the lengthwise edges of said members in one or several elastomer blocks bonded onto the frameworks.

According to an alternative embodiment, said lengthwise edges of the tubular members are oriented in parallel planes in relation to a plane defined by the main direction (z) and by said axis (y).

According to another alternative embodiment, these edges may conversely be oriented in perpendicular plane to the main direction (z) in which the load is exerted.

Finally, irrespective of the embodiment selected, it will still be advantageous that the tubular members be embedded in a protective elastomer coating, which may possibly be provided with folds or ridges.

A brief description will now be made with reference to the various figures of the enclosed drawing which, except for FIGS. 1a, 17 et 18, are all cross sections, in some cases partial cross sections, of various resilient supports according to the invention, illustrating the various aforesaid embodiments, whereby FIG. 1a shows the vertical section of the frameworks and FIGS.

17 et 18 perspective views of the open profiles intended for the construction of the tubular members.

It should first be pointed out that in order not to multiply the description and representation of the alternatives—which are in very great number—it will be assumed in the following description that all supports and even, as the case may be, the supports having a vertical stiffness gradient, are of the type with anisotropic stiffness. They might all feature, on the contrary, isotropic stiffness or partially isotropic stiffness, capable of yielding for example, in some cases, substantially the same stiffness in the lengthwise direction (x) as well as in the crosswise direction (y) particularly as far as the engine supports with vertical stiffness gradient are concerned.

With respect to the following representation and description, it would suffice for example in order to achieve this, to increase the thickness of the linking elastomer or other elastic material between the frameworks and the tubular members in order to bestow upon it a lesser crosswise stiffness.

It could also be contemplated to superimpose two identical supports by crossing at right angle the respective directions of the tubular members, whereby the stiffnesses in the directions x and y can then easily be made equal, with identical supports.

On the figures, reference numeral 1 designates the frameworks of the supports and 2 the linking elastomer or other elastic material between the frameworks and the tubular member (s) out of composite material. The axes x (lengthwise direction with low stiffness), y (crosswise direction with high stiffness) and z (vertical direction with intermediate stiffness) have solely been represented on FIGS. 1 and 9. These axes are oriented in the same manner on the other figures.

Figure 1:
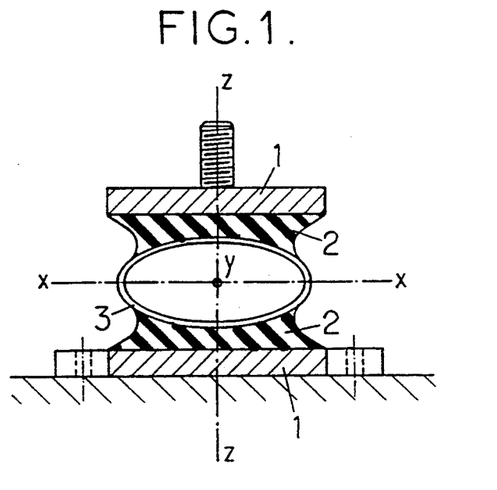
FIG. 1 is a sectional elevation view of a first embodiment of a resilient support according to the present invention.

FIG. 1 shows the most simple embodiment, with a single tubular member, bearing a reference numeral 3. Its cross section is of oval or elliptic shape and its major axis is the one of the x's.

Figure 1A:
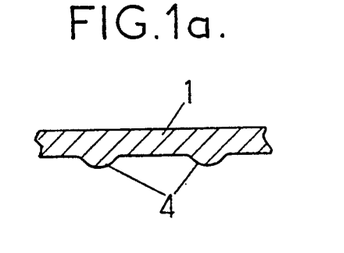
FIG. 1a is a sectional view of a portion of an embodiment of a framework shown in FIG. 1.

The very low stiffness of the support in the direction x is obtained due to the rolling of the member 3 on the connecting means 2 when horizontal stresses of opposite directions are exerted on the frameworks 1 in this direction x. Its high stiffness in the direction y results from the high stiffness of tube 3 in this direction, as well as from the low shearing stress of the elastomer 2, still decreased because of the catches 4 on the frameworks, as shown on FIG. 1a. As to the stiffness in the vertical direction z, it is essentially the one of tube 3 in this direction and intermediate between the other two (the values of the respective stiffnesses have been given above).

Such a support is subsequently particularly quite suitable for the suspension of an automotive vehicle body, for the reasons equally stated above.

Figure 1B:
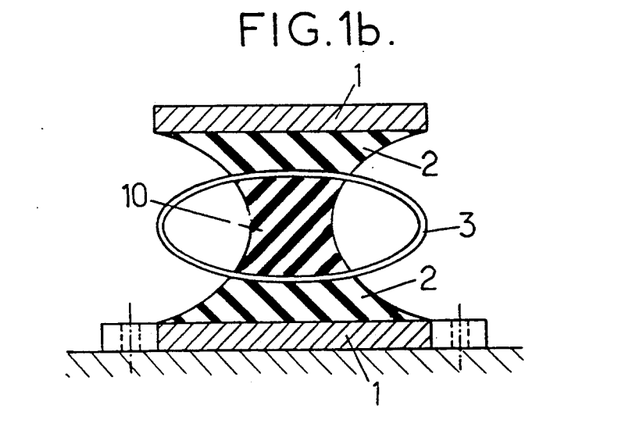
FIG. 1b is a sectional elevation view of a second embodiment of a resilient support according to the invention.

The alternative embodiment of FIG. 1b shows that the tubular member 3 may contain a spacer out of elastic material 10 bonded at its ends onto the two opposite walls of this member, whereby this spacer 10 extends in the main direction z of the load. This enables one to have available an additional parameter with a view to adjusting the vertical stiffness without interfering with the crosswise stiffness (in y): actually, the slender shape of spacer 10 will make it possible to virtually prevent the rolling of the tubular member 3 between its stands 2 from being slowed down.

Figure 2:
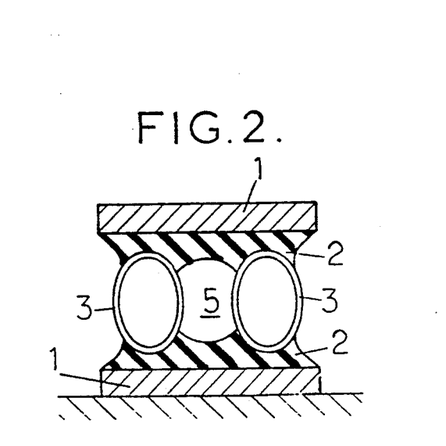
FIG. 2 is a sectional elevation view of a third embodiment of a resilient support according to the present invention.

The support of FIG. 2 is of the same general type as the one of FIG. 1 but incorporates two tubular members 3 having an elliptic section (with the great vertical axis) arranged parallel one to the other by an elastomer void space 5. Such a support makes it possible to attain a greater flexibility in the lengthwise direction (axis of the x's).

FIGS. 3 to 6 show supports having a stiffness gradient in the vertical direction, intended for example for supporting engines.

Figure 3:
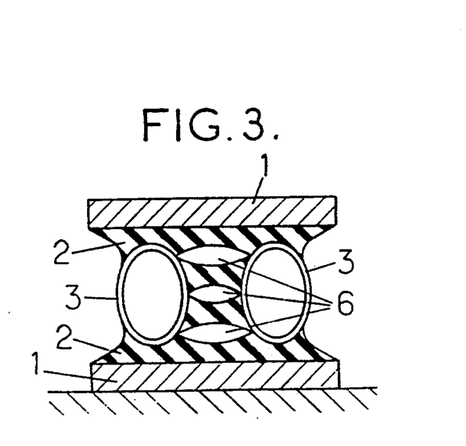
FIG. 3 is a sectional elevation view of a fourth embodiment of a resilient support according to the present invention.

On FIG. 3, the stiffness gradient is obtained by means of three cells 6 made in the elastomer mass which separates the two tubes 3 and which are elongated in the direction of the x's. It will be appreciated that the sharp increase in the vertical stiffness takes place when the cells 6 are totally flattened out under the action of vertical compressive stresses which are exerted on the frameworks 1. The advantage resulting from the fact that the elliptic cross section of the tubes 3 of the composite material has a vertical greater axis has equally been explained in the foregoing description.

Figure 4:
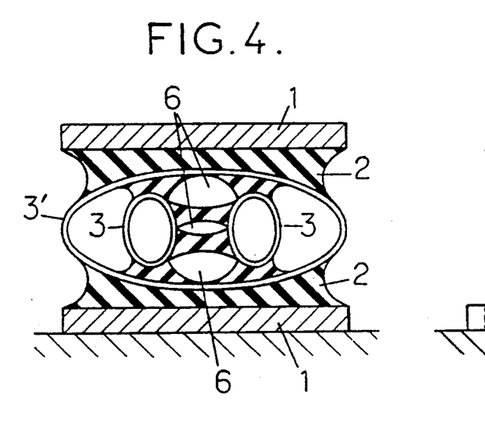
FIG. 4 is a sectional elevation view of a fifth embodiment of a resilient support according to the present invention.

The same crushing phenomenon of the cells 6 is used in the embodiment of FIG. 4. In this case, provision has further been made for an additional external tubular member 3' having a lower stiffness, possibly prestressed, surrounding the internal tubular members 3, all of them being made out of an appropriate composite material. The vertical stiffness can thus be very low up to the moment when the highest stiffness of the internal tubes 3 takes place.

FIGS. 3 and 4 illustrate what has been hereabove referred to as "first embodiment".

Figure 4A:
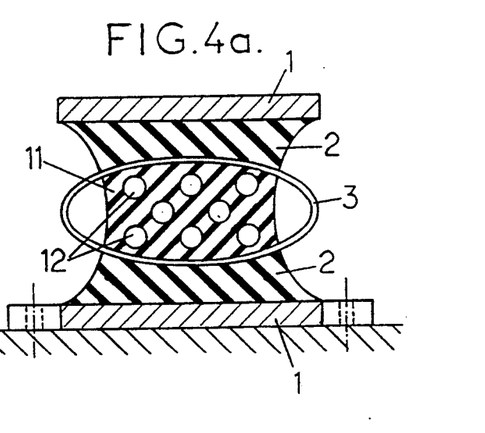
FIG. 4a is a sectional elevation view of a sixth embodiment of a resilient support according to the present invention.

An alternative embodiment is represented on FIG. 4a which shows, inside a tubular member 3, a spacer block 11 out of elastic material, bonded at its ends onto the two opposite walls of this member. Here again, this block extends in the main direction z of the load, whereby it is provided internally with cells 12 having determined dimensions. The increase in stiffness here again takes place during the complete crushing of cells 12. Their vertical dimensions are thus determined, as in the previous cases, based upon the selection of the crushing value of the support at which the vertical stiffness gradient is to take place. As a matter of fact, several gradients can be provided, by carrying out for example several superimposed rows of cells, in which the diameters thereof are different.

Figures 5, 6:
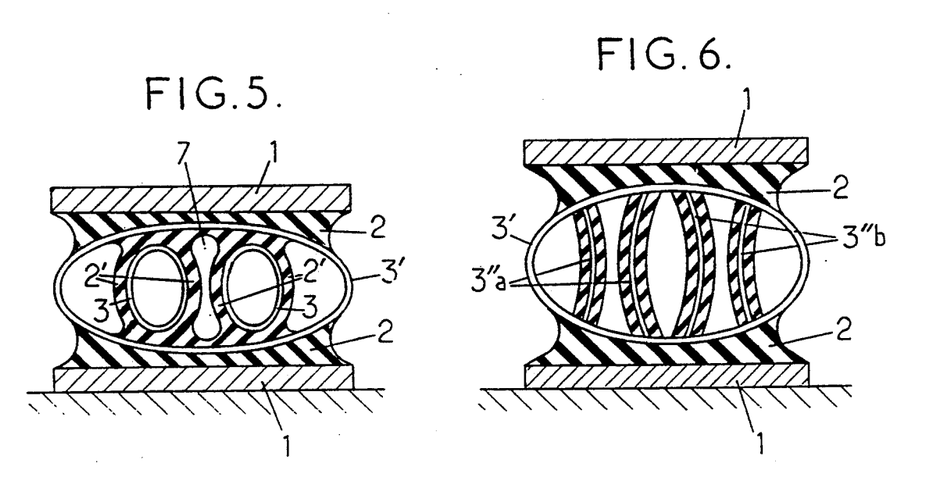
FIG. 5 is a sectional elevation view of a seventh embodiment of a resilient support according to the present invention.
FIG. 6 is a sectional elevation view of a eighth embodiment of a resilient support according to the present invention.

The "second embodiment" is illustrated in FIG. 5 and its alternative on FIG. 6.

On FIG. 5, a flattening out of space 7 made between the two internal tubular members 3, coated with elastomer, referenced as 2', are implemented. This flattening out of space 7 is obtained following a widening out of the cross section of the tubes 3 in the direction of the x's when the vertical compressive stresses are exerted onto the frameworks 1. When this flattening out is complete, a sharp increase in the vertical stiffness is obtained as a result.

It should be noted that this space 7 may be filled with a damping material or closed so as to build up the equivalent of an air chamber; it might also be filled with a flexible alveolate material incorporating closed cells.

The external tubular member 3' serves the same function as in the embodiment shown in FIG. 4. It should furthermore be noted that a substantial damping effect can be obtained by using as elastomer 2' a material featuring a high damping coefficient such as Butyl.

In the alternative of FIG. 6, there is used so to speak only part of the walls of the tubular members 3, which walls are thus limited to arched legs 3"a and 3"b of a composite material wrapped in elastomer or other elastic material.

The sharp increase in the stiffness in the vertical direction takes place in this case when the lens of each pair come into contact two by two (on their convex sides) under the effect of the vertical compressive stresses exerted on the frameworks 1.

Figure 7:
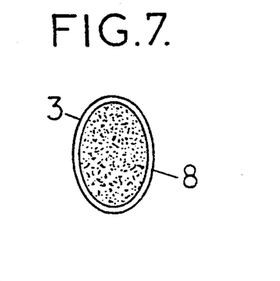
FIGS. 7 and 8 are sectional views of a resilient tubular member in accordance with the invention filled with a damping material.
Figure 8:
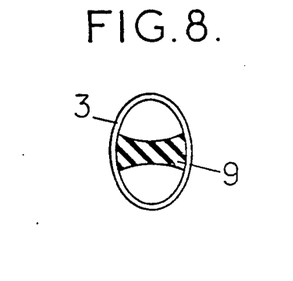

FIGS. 7 and 8 show two different means capable of being used in order to increase the damping effect of the support.

In the case of FIG. 7, a tubular member 3 of the support is shown as having been filled with a damping material, for example with silicon gel, referenced with the numeral 8. This filling may be contained at the ends of the tubular member 3 by means of resilient diaphragms for example elastomer diaphragms.

In the case of FIG. 8, the damping is obtained by a strip 9 for example a Butyl strip, horizontally connecting two opposite walls of a tubular member 3 of the support.

In FIGS. 9 to 18, the same references as in FIGS. 1 to 8, generally still apply to designate the same elements or element similar or serving the same purpose.

These frameworks thus bear the reference numeral 1, the linking elastomer blocks 2 or 2a and 2b and the tubular members out of composite material (resistant resin-immersed fibers) 3 or 3a and 3b.

Figure 9:
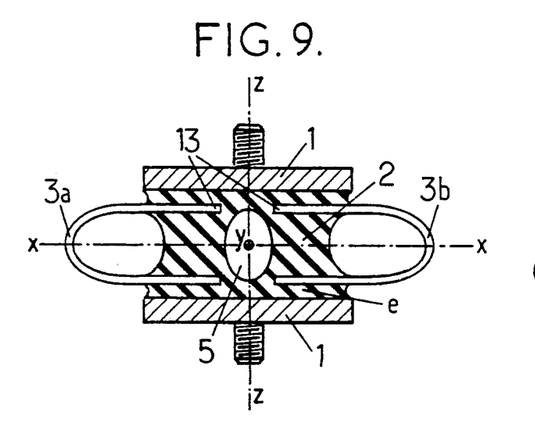
FIG. 9 is a sectional elevation view of a ninth embodiment of a resilient support according to the present invention.
Figure 17:
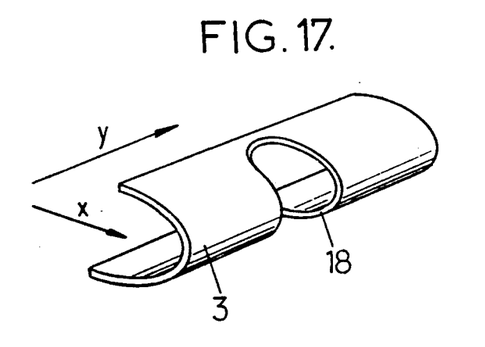
FIGS. 17 and 18 are perspective views of resilient tubular members in accordance with the invention.

The three axes x, y and z of the supports are only shown on FIGS. 9 and 17 pro memoria.

On FIG. 9, the tubular members 3a and 3b are seen with a U-shaped section and are opened one towards the other; they are mutually symmetrical in relation to the plane containing the axes y and z, plane which consequently is perpendicular to the axis of the x's. The frameworks are connected with an elastomer block 2 bonded to these frameworks and capable of containing an internal cell 5, which may serve the same function as in the embodiment of FIG. 2 (obtaining a stiffness gradient in direction z). The lengthwise edges 13 of the tubular members are oriented in planes perpendicular to the direction z and are recessed and bonded in block 2. The thickness e of the elastomer material comprised between the edges 13 and the frameworks 1 must be low since they essentially determine the stiffness of the support in the crosswise direction y, which in principle must be high.

Figure 10:
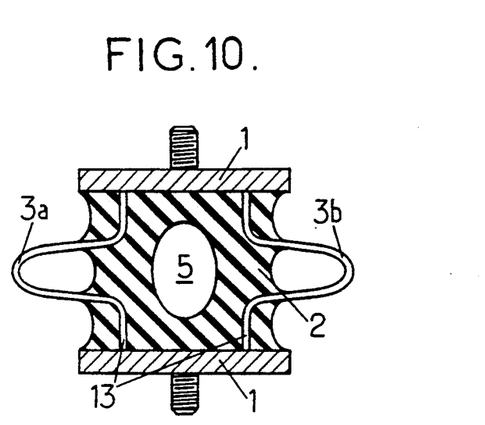
FIG. 10 is a sectional elevation view of a tenth embodiment of a resilient support according to the present invention.

This problem can be avoided with the embodiment of FIG. 10, in which conversely the recessed lengthwise edges 13 of the tubular members 3a and 3b are parallel to the above defined symmetrical plane, these edges 13 resting on the respective frameworks 1. In this case, as stiffness of the support in the direction y, one can essentially maintain the one of the tubular members 3a and 3b themselves, since the latter ones cannot "play" with respect to the frameworks. A very anisotropic support can then be obtained according to the operating procedures set forth in the above explanation.

Figure 11:
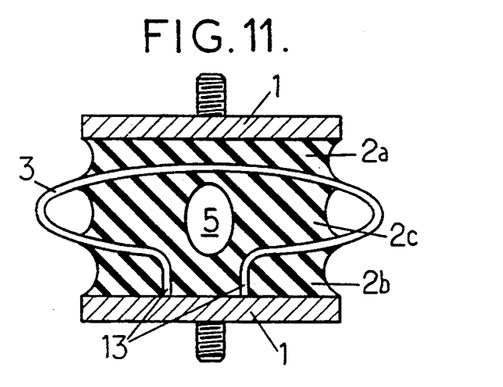
FIG. 11 is a sectional elevation view of a eleventh embodiment of a resilient support according to the present invention.

The embodiment of FIG. 11 can be considered as a combined embodiment in relation to the two foregoing embodiments, with the edges 13 resting on a single framework 1, theses edges being embedded or recessed between an internal elastomer block 2c provided with a cell 5, and an external block 2b. Opposite to it, a bonded elastomer block 2a ensures the connection between the back of the tubular member 3 and the other framework 1. Here again, if it is desired to maintain a very great stiffness in direction y, this block 2a should be of a very small thickness (on FIGS. 9 and 10, the thickness may be considered as being exaggerated).

Figure 12:
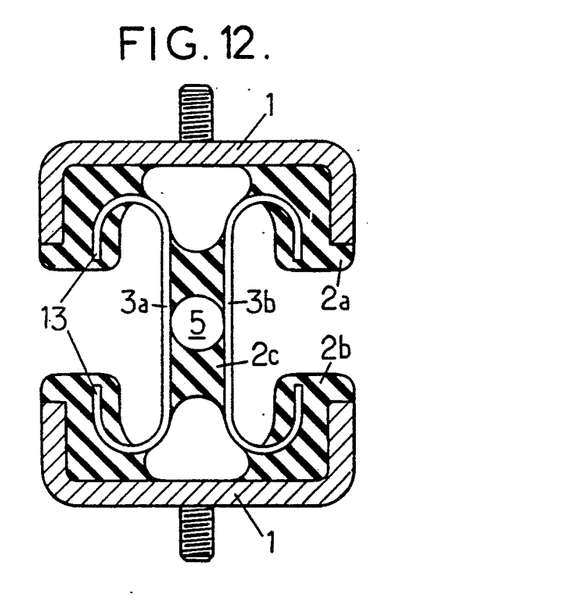
FIG. 12 is a sectional elevation view of a twelfth embodiment of a resilient support according to the present invention.
Figure 13:
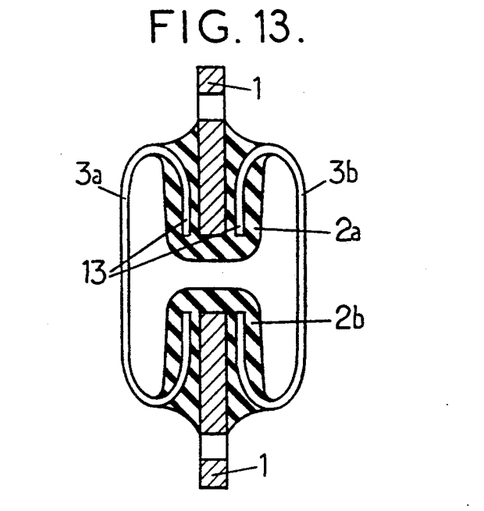
FIG. 13 is a sectional elevation view of a thirteenth embodiment of a resilient support according to the present invention.

In the embodiments of FIGS. 12 and 13, the tubular members 3a and 3b have a C-shaped section and are opened opposite one to the other (FIG. 12) or one towards the other (FIG. 13).

In the case of FIG. 12, the frameworks 1 can be trough-shaped in order to accommodate the elastomer blocks 2a and 2b in which the edges 13 of the tubular members, symmetrical one to the other in relation to the above defined plane, are embedded. A third elastomer block 2c bonded between the back of the tubular members may be used for obtaining a stiffness gradient thanks to its cell 5, in the same manner as described hereabove. This embodiment makes it possible to obtain in any case a very low stiffness in direction x.

The embodiment of FIG. 13 is more compact since as can be seen, in this case, the production of the frameworks 1 under the form of simple coplanar plates proves to be easy.

Also in this embodiment, provision could be made internally for an additional elastomer block containing one or several cells with a view to obtaining the stiffness gradient.

Figure 14:
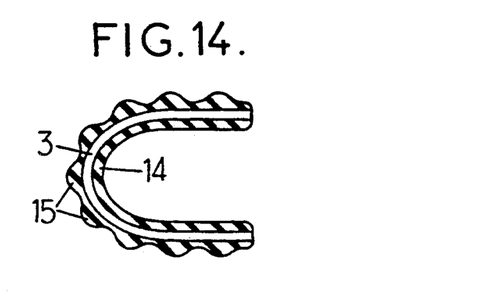
FIGS. 14–16 are sectional views of resilient tubular members in accordance with the invention.
Figure 15:
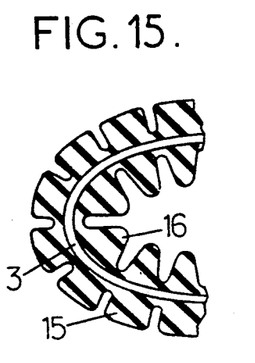
Figure 16:
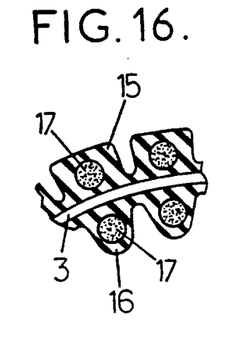

In all the above described embodiments, it is advantageous to wrap the tubular members in a protective elastomer layer 14 as shown in FIGS. 14 to 16. These tubular members, which prove relatively vulnerable to shocks are thus protected against their environment (grit, dampness). The external beads or ridges of a relatively small height as shown on FIG. 15, may significantly increase the protection against shocks without increasing the thickness of the layers 14 over their whole surface, therefore without notably altering the resiliency of the tubular members.

As shown in FIGS. 15 and 16, provision can in return be made both inside and outside the tubular members 3, for substantially crenellated beads or ridges 15 and 16. In this case, their dimensions and their spacing can be selected in such a way to vary the stiffness of the spring by a predetermined amount, beyond a certain vertical displacement under compression and/or traction.

Provision can also be made for a mass out a damping material 17 to be included in said beads or ridges, this mass being for example a silicon gel.

FIG. 17 shows still another possible embodiment of resilient tubular member 3 capable of being used in the resilient support of a suspension system according to the present invention. The flank of this member is provided with a closed edge opening 18 which makes it possible to significantly increase the ratio between the stiffness in the direction y and the stiffness in the direction x.

Figure 18:
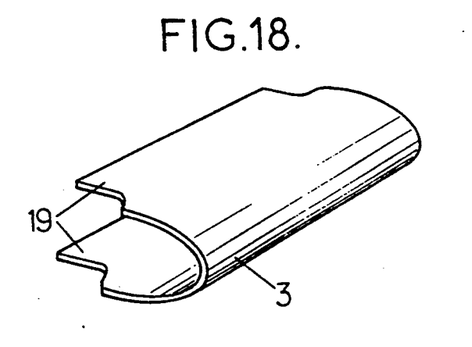

The same result can be obtained with the embodiment shown in FIG. 18 which illustrates a tubular member 3 with narrowed ends 19 to be recessed or embedded, that is to say of a lesser length than the one of this member in the direction y.

Finally, it should be noted, and irrespective of the embodiment selected for the tubular members 3, that the latter ones can be laminated, i.e. may consist of several walls of superimposed elementary tubular members.

We claim:

1. A resilient support, having at least one cavity for a suspension system comprising two frameworks provided with means for respectively fastening the frameworks to two assemblies between which the support is interposed so as to bear a compressive load between two assemblies, said support comprising, a main resilient element for supporting said compressive load including at least one resilient closed tubular member comprising a fiber-containing composite, the longitudinal axis (y) of which extends perpendicularly to the main direction (z) in which said compressive load is exerted, and a pair of elastic connector elements affixed between said tubular member and each corresponding framework on either side of said tubular member so as to separate the tubular member from said frameworks along the full length of the tubular member and so as to connect said tubular member between said frameworks in a manner such as to permit rolling of the tubular member on said elastic connector elements, said tubular member or at least said one cavity of the support containing a damping element, and said support further comprising means for providing said support with a stiffness gradient in the vertical direction such that the stiffness of the support sharply increases when a predetermined crushing point of the support is reached.

2. A support according to claim 1, wherein an elastomer with a high damping coefficient internally connects two opposite walls of the tubular member.

3. A support according to claim 1, including between said frameworks at least two of said resilient tubular members arranged in spaced, parallel relation to one another.

4. A support according to claim 3, wherein at least one elastomer void space is provided between said tubular members, said void space incorporating a plurality of superimposed closed cells, the cross section of said cells extending essentially in the lengthwise direction, and said cells being totally flattened out when said determined crushing point of the support is reached.

5. A support according to claim 4 further including an external tubular member surrounding the said at least two tubular members arranged parallel to one another, said at least two tubular members comprising a composite material with a relatively high stiffness, and said external tubular member comprising a composite material with low stiffness.

6. A support according to claim 3, wherein at least one elastomer void space is provided between said tubular members, the cross section of said void space extending essentially in the vertical direction, and said void space being totally flattened out when said predetermined crushing point of the support is reached, this flattening out following upon a widening out, in said lengthwise direction, of the cross section of said tubular member.

7. A support according to claims 6 further including an external tubular member surrounding the said at least two tubular members arranged parallel to one another, said at least two tubular members comprising a composite material with a relatively high stiffness, and said external tubular member comprising a composite material with low stiffness.

8. A support according to claim 1, having different stiffness according to its three orthogonal axes, and particularly a stiffness in the crosswise direction (y axis) of at least one order of magnitude greater than the stiffness in the lengthwise direction (x axis), whereby a stiffness in the direction of the main compressive load (z axis) is intermediate between those in the crosswise and lengthwise directions, the tubular member extending in said crosswise direction so as to be able to roll on said connecting means when the frameworks move one in relation to the other in said lengthwise direction, and said connecting means connecting said tubular member with the respective frameworks have a higher stiffness, at least in said crosswise direction.

9. A support according to claim 8, wherein the tubular member contains a spacer of plastic material bonded by its ends between two opposite walls of said tubular member so that the spacer extends in the main direction of the load.

10. A support according to claim 1, wherein said tubular member is arranged such that its cross section globally extends in said lengthwise direction, said resilient member comprising an internal spacer block of an elastic material bonded at its ends to the two opposite walls of said tubular member so that said block extends in the main direction of the load and is internally provided with cells having predetermined dimensions.

11. A resilient support, having at least one cavity for a suspension system comprising two frameworks provided with means for fastening the frameworks respectively to two assemblies between which the support is interposed so as to bear a compressive load between two assemblies, said support comprising, a main resilient element for supporting the compressive load including at least one resilient tubular member comprising a fiber-containing composite, the longitudinal axis (y) of which extends perpendicularly to the main direction (z) in which said compressive load is exerted, and a pair of elastic connecting elements affixed between said tubular member and each corresponding framework on either side of said tubular member for fastening said tubular member between said frameworks so as to separate the tubular member from said frameworks along the full length of the tubular member and so as to connect said tubular member between said frameworks in a manner such as to permit rolling of the tubular member on said elastic connector elements, said resilient tubular member comprising at least one open profile, said tubular member comprising at least said one cavity of said support containing a damping element and said support further comprising means for providing said support with a stiffness gradient in the vertical direction such that the stiffness of the support sharply increases when a predetermined crushing point of the support is reached.

12. A support according to claim 11, wherein said resilient tubular member comprises at least two open profiles.

13. A support according to claim 12, wherein the two said profiles are opened one towards the other.

14. A support according to claim 12, wherein the two said profiles are opened opposite one to the other.

15. A support according to claim 11, wherein said means for fastening the tubular member to the frameworks comprises anchoring devices for lengthwise edges of said tubular member in at least one elastomer block bonded to the frameworks.

16. A support according to claim 15, wherein said lengthwise edges of the tubular member are oriented in planes parallel to a plane defined by said main direction and by said axis of said tubular member.

17. A support according to claim 15, wherein said lengthwise edges of the tubular member are oriented in planes perpendicular to the main direction.

18. A support according to claim 11, wherein the tubular member is encased in a protective elastomer layer.

19. A support according to claim 18, wherein protective layer presents beads or ridges outside or inside the tubular member.

20. A support according to claim 19, wherein said beads or ridges are strongly crenellated to form a spring, their dimensions and their spacing being selected in such a way to vary the stiffness of the spring formed thereby by a predetermined amount, beyond a predetermined vertical displacement.

21. A support according to claim 20 wherein the mass of said damping element is incorporated in said beads or ridges.

22. A support according to claim 19 wherein the mass of said damping element is incorporated in said beads or ridges.

23. A support according to claim 11, wherein the tubular member contains an opening in a flank portion thereof.

24. A support according to claim 11, wherein the tubular member includes narrowed engageable ends of a shorter length than the length of the tubular member in the longitudinal direction thereof.

25. A support according to claim 11, wherein the tubular member is laminated.

* * * * *